United States Patent [19]

Klebe, Jr.

[11] 3,958,331

[45] May 25, 1976

[54] GARDEN TOOL WITH MOVABLE BLADE AND DETACHABLE STATIONARY BLADE

[75] Inventor: Elmer C. Klebe, Jr., Easley, S.C.

[73] Assignee: The Singer Company, New York, N.Y.

[22] Filed: Feb. 3, 1975

[21] Appl. No.: 546,653

[52] U.S. Cl. .................. 30/216; 30/DIG. 1; 172/41
[51] Int. Cl.² .................. B26B 19/04; A01D 53/10
[58] Field of Search ............ 172/40, 41, 54; 56/242; 30/200, 216, 220, 221, 222, 223, 224, 329, 337, 338, 339, 500, DIG. 1

[56] References Cited
UNITED STATES PATENTS

| | | | |
|---|---|---|---|
| 1,458,250 | 6/1923 | Staudinger | 30/216 |
| 1,582,324 | 4/1926 | Whitcomb | 30/222 X |
| 1,871,700 | 8/1932 | Jeppsson et al. | 30/216 |
| 1,919,516 | 7/1933 | Koch | 30/216 |
| 3,233,324 | 2/1966 | Van Der Heide | 30/221 X |
| 3,623,223 | 11/1971 | Edgell et al. | 30/220 |
| 3,774,302 | 11/1973 | Ketchpel, Jr. et al. | 30/216 X |
| 3,851,388 | 12/1974 | Weber et al. | 30/223 |
| 3,854,203 | 12/1974 | Paule et al. | 30/220 |

Primary Examiner—Anton O. Oechsle
Assistant Examiner—Richard T. Stouffer
Attorney, Agent, or Firm—Robert E. Smith; Edward L. Bell; Harold Weinstein

[57] ABSTRACT

A portable garden tool with an upper movable tool element which is provided with a blade having a plurality of cutting teeth and a lower tool element which is in two pieces so that one can be removed from the tool. The removable portion is either a shear blade attachment to perform with the upper tool element as a shear, or a cultivator attachment to perform with the upper tool element as a cultivator. The tool can also be used as a cultivator without damage to the performance of the tool as a shear, since the blades of the upper movable tool element are not sharpened.

4 Claims, 16 Drawing Figures

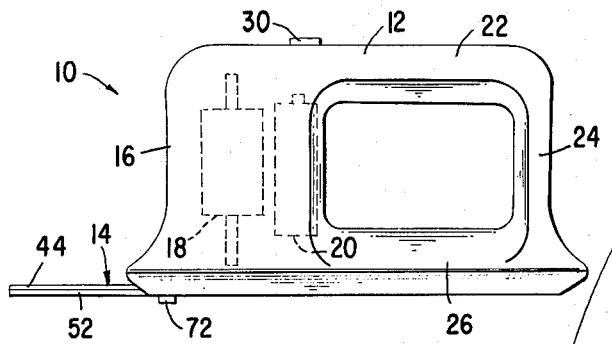
Fig. 1    Fig. 2
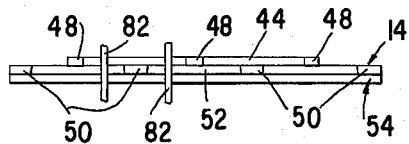
Fig. 3
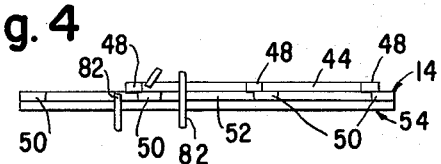
Fig. 4
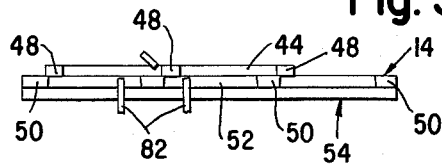
Fig. 5
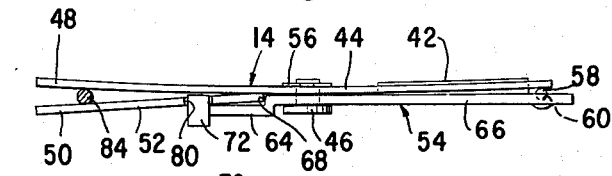
Fig. 6
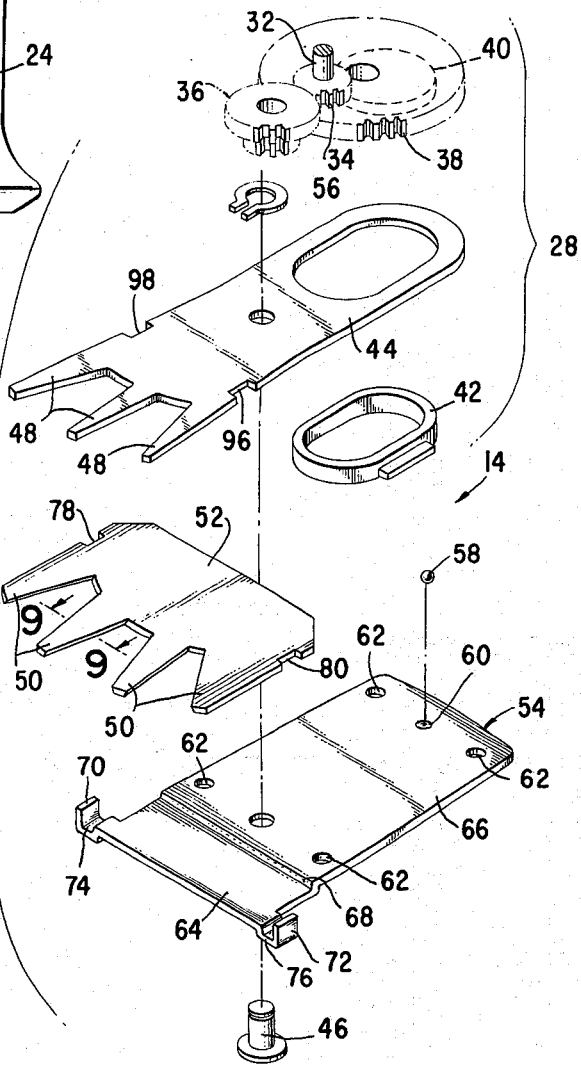
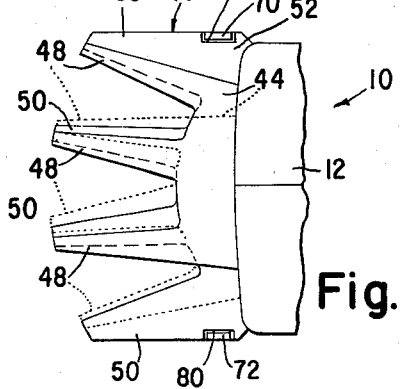
Fig. 7
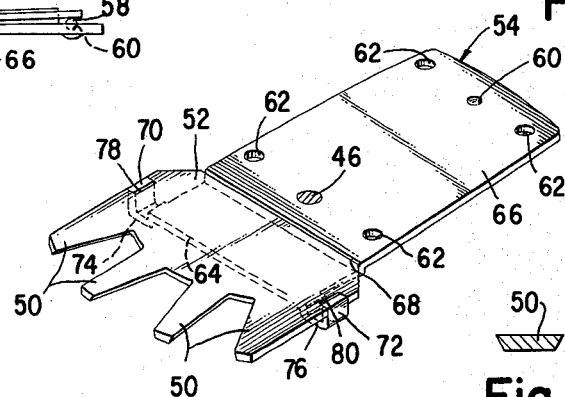
Fig. 8    Fig. 9

GARDEN TOOL WITH MOVABLE BLADE AND DETACHABLE STATIONARY BLADE

BACKGROUND OF THE INVENTION

1. Field of the Invention

This invention relates to electrically powered garden tools, and more particularly the invention relates to work tool elements for the garden tool.

2. Description of the Prior Art

Various electrical powered garden tools are well-known to have shear blades driven in an oscillatory motion for cutting grass, hedges, and the like, and similarly garden tools are also known to have digger elements or tines for the purpose of tilling the soil, such as around small flower beds. However, no provision was made in either type of the prior art garden tools whereby the shear blades could be replaced with digger elements and vice versa. In other words, separate garden tools with either the shear blades or the digger elements were required. Furthermore, it was obviously not feasible to utilize the shear blades themselves as digger elements since the working of the soil with the shear blades would not only dull the blades but probably cause them damage.

Another deficiency in the prior art garden tools was the difficulty of sharpening the shear blades without completely disassembling the garden tool. In addition, the prior art garden tool shear blades were usually made of blades of different thicknesses to facilitate sharpening and/or made of tempered steel which were difficult to manufacture because of the distortion and other problems introduced by the tempering of the steel.

SUMMARY OF THE INVENTION

This invention resides in providing a portable garden tool preferably light-weight and battery-operated, with upper and lower tool elements of plate metal. The upper tool element is movable and is provided with blades, while the lower tool element is in two pieces so that one can be removed from the tool. The removable element is either a shear blade attachment to perform with the upper tool element as a shear or a cultivator attachment to perform with the upper tool element as a cultivator. The ability to remove the work element of the lower or stationary tool element facilitates sharpening of the shear blades. At the same time, with both the shear blade attachment or the cultivator attachment removed, the garden tool can be used as a cultivator since only the unsharpened blades of the movable tool element are used.

The stationary and moving tool elements are the same thickness of prestressed steel formed from sheet material which eliminates heat treating and distortion caused by the heat treating, and of particular importance is the fact that it is the lower removable tool element which is sharpened for use as a shear.

BRIEF DESCRIPTION OF THE DRAWINGS

FIG. 1 is a side view of a garden tool made according to the invention;

FIG. 2 is an exploded view of the drive means and tool elements in the form of a shears;

FIGS. 3, 4 and 5 are a partial front view showing the operation of the shears forming the tool elements;

FIG. 6 is a side view of the tool elements with a tough uncut stem caught between the blades;

FIG. 7 is a partial top view showing the blades of the shears relative to the housing;

FIG. 8 is a perspective view of the removable tool member in the form of a shear attachment and the stationary member;

FIG. 9 is a cross-sectional view taken along line 9—9 of FIG. 2 showing the sharpened cutting edge of one of the stationary blades;

DESCRIPTION OF THE PREFERRED EMBODIMENTS

Figure 10:
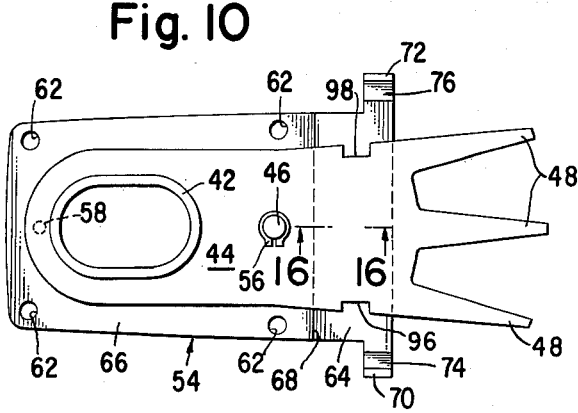
FIG. 10 is a top view of the movable tool element and the stationary member with the removable shear attachment actually removed.

Referring to the drawings, the garden tool of the present invention is indicated in its entirety as 10, and comprises a housing 12 and tool elements 14 which, in FIG. 1, are in the form of a pair of shears. The housing 12, conventionally of molded high impact plastic and usually in two half sections, provides a front vertical generally tubular compartment 16 in which is housed a high speed DC motor 18 and a rechargeable battery pack 20. The housing further has a substantially horizontal tubular portion extending from the top of the compartment 16 forming a handle 22. The vertical tubular portion 24 connects the handle 22 with a base portion 26 which, in turn, connects with the vertical tubular compartment 16 at the bottom thereof to provide continuity between all the portions of the housing. The base portion contains a drive means, indicated in its entirety as 28 in FIG. 2, for the tool elements 14. Since the motor 18 and the battery pack 16 and associated control switches, one of which is partially shown in FIG. 1 as 30, form no part of the present invention, no further description thereof is deemed necessary herein, suffice to say that those skilled in the art will understand that the arrangement of the motor and battery pack, as well as the tool elements and the drive means, should be arranged for good weight balance for comfortable handling of the garden tool when the handle is gripped by the operator during use.

The drive means 28 housed within the base portion 26 comprises a drive shaft 32 which rotates a pinion gear 34 at a relatively high speed to drive a combination gear 36 on a stub shaft (not shown). The combination gear 36, in turn, drives a spur gear 38 which also rotates on a stub shaft (not shown). The spur gear 38 includes an integral drive cam 40 which wipes against a plastic bearing insert 42 which is mounted in an upper movable plate-like tool member 44 so that as spur gear 38 rotates, the tool member 44 is oscillated back and forth on a pivot pin 46. The tool member 44 serves as a drive for blade 48, having three cutting teeth shown, formed as an integral part of the tool member 44 and which, as part of the tool elements 14, act as shear elements cooperating with blade 50, having four stationary teeth shown, formed on a removable stationary tool member in the form of a shear blade attachment 52. Pivot pin 46, about which tool member 44 oscillates, passes through a lower fixed support plate 54 to be anchored thereby. Lock ring 56 is mounted on the pivot pin 46 to detachably lock the support plate 54 and the upper tool member 44 together while a steel ball bearing 58 located in a dwell 60 in the support plate 54 serves to cant the tool member 44 to enhance the shearing action of the teeth of the respective blades 48, 50. Support plate 54 also forms a bottom cover for the base portion 26 and is attached thereto by suitable screws through holes 62.

The support plate 54 is actually divided into two separate layers 64 and 66 separated by a small ridge 68 so as to space the layer 64 from the layer 66 a sufficient distance to accommodate the stationary tool member 52 when the support member 54 is attached to the housing and the tool is to be used as a shear. In the attached position, ridge 68 is located near the front edge of the housing 12. Support plate 54 is also provided with a pair of upwardly extending prongs 70, 72 formed on the opposite sides of the layer 64. Prongs 70, 72 are spaced a distance from the edges of the layer 64 by horizontally extending ears 74, 76 located below the plane of the reference 64 so as to engage suitable complementary slots 78, 80 located on the outer edges of the stationary shear blade attachment 52. Thus, when assembled, the stationary shear blade attachment 52 is sandwiched between the movable tool member 44 and the surface of layer 64 but remains stationary since it is attached to the stationary base support plate 54. Too, the top edges of the prongs 70, 72 extend upwardly a sufficient distance so as to be level with the top of the shear blade attachment 52 when assembled as shown in FIGS. 6 and 8.

When the garden tool is used as a shear for shrubs, grass, and the like, the lower replaceable shear blade attachment 52 is placed between the upper tool member 44 and the support member 54 and locked in place by the prongs 70 and 72 in the notches 78 and 80, respectively. Rotation of the spur gear 38 by the motor 18 causes the cutting teeth of upper blade 48 to oscillate to cut grass, plant stems, and the like, such as shown in FIGS. 3, 4 and 5 where the cutting teeth of the blade 48 are shown in different positions, thereby cutting the parallel grass blades 82 in the manner shown. Note, too, if a thick stem 84, such as a piece of shrubbery, becomes twisted and lodged between the blades, such as shown in FIG. 6, the lower shear blade attachment 52 will pivot about the front edge of the support member 54 without damage to the blade or garden tool as a whole until the stem can be removed.

Before proceeding further in the description of this invention, it should be pointed out that the upper driving member 44, the base support plate 54, as well as the tool member 52, are made from standard thickness prestressed sheet steel by a suitable die punching operation. This method of manufacture eliminates heat treating and distortion caused by heat treating of the cutters, and saves the expense of selecting sheets of steel of different thicknesses, etc., with the additional advantage that the tool member 52 is easily replaceable and the teeth of the blade 50 are easily sharpened as by grinding, such as shown in FIG. 9, while separated from the garden tool itself.

Figure 11:
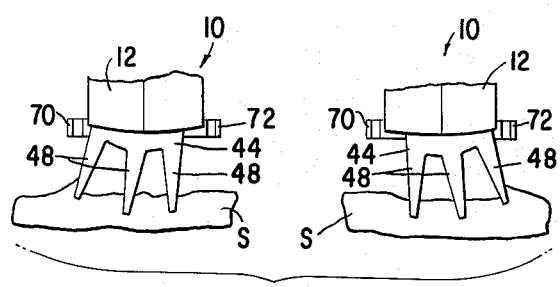
FIG. 11 shows the movable tool element utilized as a cultivator.

Particular attention is now directed to FIGS. 10 and 11. FIG. 10 is a top view of the assembly comprising the upper tool member 44 and lower base support member 54 without the replaceable shear blade attachment 52. With the latter removed, the garden tool 10 may be used as a cultivator by simply inserting and allowing the movable blades 48 to work the soil S, as shown in FIG. 11. This is an additional advantage in having a removable tool member such as 52, since the tool element 14 is then no longer a shear and the danger of damage to the tool elements, were a shear so utilized, is eliminated. Note, too, that since the tool member 52 is removed, it is the shear element with the sharpened blade that is removed, thus only the unsharpened blades are used.

Figure 12:
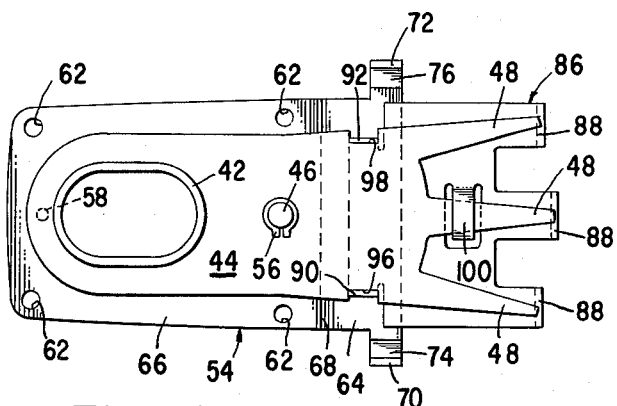
FIG. 12 is a top plan view of the movable tool element and stationary element with a removable tool element in the form of a cultivator attachment connected thereto.
Figure 13:
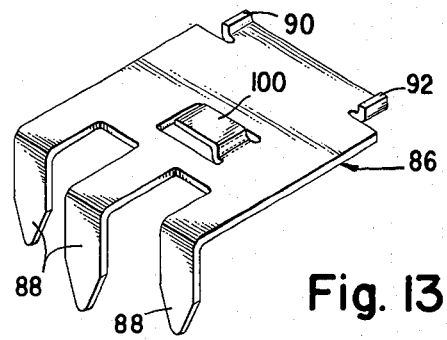
FIG. 13 is a perspective view of the removable cultivator attachment.
Figure 14:
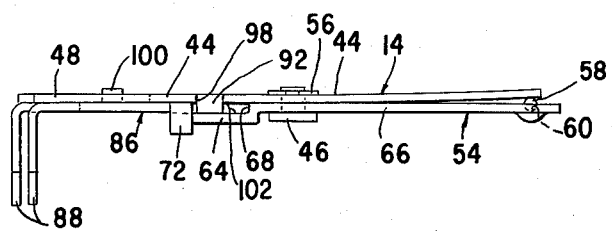
FIG. 14 is a side view of the tool element with the cultivator attachment connected therein.
Figure 15:
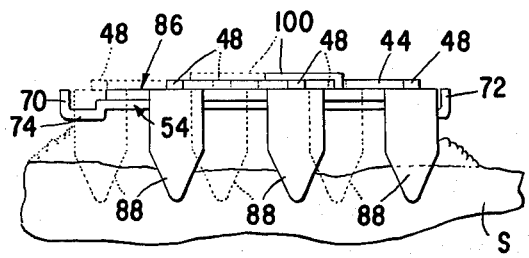
FIG. 15 is a front view of the cultivator attachment shown working the soil.

Turning now to FIGS. 12–15, it can be seen that the tool elements 14 comprise the use of the movable tool element 44 and its blades 48 to drive a removable cultivator attachment 86 having digger elements or tines 88 (three shown). The removable cultivator attachment, also made of prestressed steel by a die punch operation, like the elements of FIGS. 2–9, includes a pair of prongs 90 and 92 on the side of the attachment opposite from the tines 88 and spaced a distance to be inserted in complementary slots 96, 98 in the movable element 44 so as to be locked therewith. The cultivator attachment 86 also includes a raised finger 100 punched from the layer of the attachment centrally thereof which provides a spring clip fit over the center blade of the blades 48 of the moving tool member 44 so as to be attached thereto. FIGS. 12 and 14 show how the layer of the support member 54 and the moving tool member 44 serve to hold the cultivator attachment in a manner similar to the removable shear blade attachment 52 of FIGS. 2–9.

FIG. 13 shows the manner in which the tines 88 may work the soil S when the cultivator attachment 86 is operative.

Figure 16:
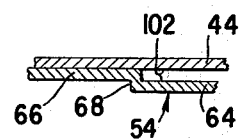
FIG. 16 is a view taken along line 16—16 of FIG. 10.

The ridge 68 serves to separate the layer 64 of the support blade 54 from the movable tool member 44 to create a space 102 therebetween as shown in FIG. 16. The space 102 aids in the assembly and disassembly of the shear blade attachment 52 and the cultivator attachment 86.

The tool member 44 is normally canted downwardly over the edge of the layer 64, but being a yieldable member, may be urged upwardly as desired during the respective assembly and disassembly operations. In order to assemble the shear blade attachment 52 to the support blade 54, the attachment 52 will be placed under the outer edge of the tool member 44 in a position adjacent to the space 102 urged upwardly and rearwardly, so as to cause the tool member 44 to be raised vertically an amount sufficient to permit the attachment 52 to be horizontally disposed within the space 102 until the rear edges come into contact with the prongs 70, 72. One edge and then the other of the shear blade attachment 52 will be vertically raised over the respective prongs 70, 72 to permit the notches 78, 80 to be snap-fitted upon the prongs 70, 72. This completes the assembly of the shear blade attachment 52, and though it is securely mounted to the layer 64 of the support blade 54, it is free to rotate slightly during the cutting action whenever necessary as shown in FIG. 6, as described hereinbefore.

In order to remove the shear blade attachment 52, first one and then the other edge is vertically raised to unseat the notches 78, 80 respectively, from engagement with the prongs 70, 72 by a forward motion. Once the notches 78, 80 have been disengaged from the prongs 70, 72, the shear blade attachment 52 is slid forward for removal from the space 102 and complete disengagement from the garden tool 10.

A somewhat similar assembly and disassembly procedure is followed for the cultivator attachment 86 except that the connection is made to the movable tool member 44. In order to complete this assembly the cultivator attachment 86 is forced into the space 102 by causing the member 44 to be vertically raised until the prongs 90, 92 are seated within the slots 96, 98 respectively. The cultivator attachment 86 is disassembled by reversing the procedure and removing the prongs 90, 92 from engagement in the respective slots 96, 98.

The space 102 provides sufficient working clearance for the respective assembly and disassembly procedures above described, to permit the same to be accomplished without the necessity of additional tools or implements to aid in the assembly and disassembly operations. All that is required is for the operator to exert a little manual force in the proper direction to accomplish the desired assembly or disassembly of the respective attachments 52 or 86.

From the foregoing it can be seen that there is disclosed herein a garden tool having the working tool elements in a three-piece arrangement. This three-piece arrangement enables the stationary blade to be easily sharpened, is economical as a replacement, and permits the use of the garden tool not only as a shear but as a cultivator either with the stationary blade removed, or with a cultivator attachment.

What is claimed is:

1. In combination with a hand-held portable grass cutting tool having a motor journaled in a housing carrying drive means driven by said motor, a blade assembly comprising:
   a. a movable blade driven by the drive means,
   b. a stationary plate connected to the housing immediately underneath the movable blade and having a step down ridge terminating in a short outer layer having a forward edge, whereby the ridge defines a space between the movable blade and the outer layer,
   c. a pair of outwardly extending prongs formed on opposite sides of the outer layer of the stationary plate,
   d. a stationary blade detachably connected to the stationary plate within the space created between the movable blade and the outer layer,
   e. a pair of recesses formed on opposite sides of the stationary blade to loosely receive the prongs therein and to hold the stationary blade in position within the space,
   f. a plurality of cutting teeth formed on the movable blade,
   g. a plurality of stationary teeth formed on the stationary blade to coact with the cutting teeth in shearing garden material, and
   h. the stationary blade fulcrumed at the outer edge of the outer layer to partake of pivotal motion upon any garden material becoming lodged between the teeth to prevent damage to the movable blade.

2. The combination claimed in claim 1 wherein:
   a. the stationary blade has a rear edge coacting with the ridge to permit the raising thereof and the movable blade upon removal of the stationary blade, whereby the prongs of the stationary plate are dislodged from the recesses of the stationary blade.

3. The combination claimed in claim 2 wherein:
   a. the stationary blade adapted to be removed to permit the movable blade to function as a cultivator.

4. The combination claimed in claim 1 wherein:
   a. the movable blade pivotally connected to the stationary member to partake of reciprocal motion at the cutting teeth thereof, and
   b. means entrapped between the movable blade and the stationary member to cant the cutting teeth and provide a cutting bias between the cutting teeth and the stationary teeth of the stationary blade.

* * * * *